United States Patent [19]

Wu et al.

[11] Patent Number: 4,461,885
[45] Date of Patent: Jul. 24, 1984

[54] NYLON PREPARATION FROM UNSATURATED NITRITE WITH AMINO ACID

[75] Inventors: Mu-Yen M. Wu; Lawrence E. Ball, both of Cuyahoga Falls, Ohio

[73] Assignee: The Standard Oil Company, Cleveland, Ohio

[21] Appl. No.: 214,169

[22] Filed: Dec. 8, 1980

[51] Int. Cl.³ .............................................. C08G 69/08
[52] U.S. Cl. .................................. 528/310; 528/315; 528/328
[58] Field of Search .................... 528/310, 315, 328; 526/301, 302, 304

[56] References Cited

U.S. PATENT DOCUMENTS 2,691,643 10/1954 Chirtel et al. ...................... 528/328
3,499,879  3/1970 Kobayashi et al. ................ 528/310
3,629,203 12/1971 Volker et al. ...................... 528/310

*Primary Examiner*—Harold D. Anderson
*Attorney, Agent, or Firm*—Larry W. Evans; John E. Miller, Jr.; David P. Yusko

[57] ABSTRACT

Polyamides can be formed in good yields by the copolymerization of at least one alpha, beta-unsaturated nitrile with at least one amino acid. These polymers are suitable for use as fibers, plastics, films and molding resins.

13 Claims, No Drawings

NYLON PREPARATION FROM UNSATURATED NITRITE WITH AMINO ACID

BACKGROUND OF THE INVENTION

This invention relates to a new process for preparing polyamides. This process comprises reacting an alpha, beta-unsaturated nitrile with at least one amino acid.

The preparation of a polyamide from acrylonitrile and water is disclosed in U.S. Pat. Nos. 3,629,203 and 3,499,879. Moreover, the preparation of a polyamide from an amino acid is shown in U.S. Pat. No. 2,691,643. Surprisingly, applicants have discovered that combining these reactants in a single system produces high yields of a polyamide which has particularly good physical properties.

There are several advantages in producing polyamides by the process of the instant invention. First, the water of condensation produced by the polymerization of the amino acid is consumed internally by the alpha, beta-unsaturated nitrile, thus avoiding or reducing the requirement for vacuum stripping of the water. Second, the polyamides produced by the process of this invention are more crystalline than those produced by the prior art methods. Third, it is possible to obtain a polyamide in higher yields than has heretofore been known.

SUMMARY OF THE INVENTION

It has now been discovered that polyamides containing a three carbon backbone can be produced by reacting an alpha, beta-unsaturated nitrile with an amino acid. More particularly, it has been discovered that a polyamide can be produced by copolymerizing an alpha, beta-unsaturated nitrile with at least one of beta-alanine. Especially good results have been achieved when the alpha, beta-unsaturated nitrile is acrylonitrile.

DETAILED DESCRIPTION

The Polymer

The polyamides obtained by the process of this invention are generally defined as containing three carbon repeating units as follows:

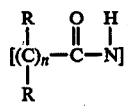

wherein R is a suitable substituent and n is 2.

It is also possible by the process of this invention to form copolymers wherein the polymer contains more than one type of polyamide repeating unit. For example, when acrylonitrile is reacted with omega-aminocaproic acid, a polyamide with a mixture of the following structural units is produced:

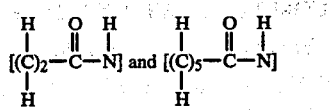

The compositions of this invention are useful in combination with other monomers and/or resins. Preferred monomers and resins which can be combined with the instant composition include polyamides such as nylon-4, nylon-6, nylon-6,6, nylon-6,10, nylon-11, nylon-12, or monomers thereof, esters such as methyl acrylate, unsaturated acids or salts thereof and vinyl monomers such as acrylamide.

The properties of the polymers obtained by the inventive process vary depending upon the monomers used and the reaction conditions. The preferred polyamides are melt processable without decomposition and highly crystalline.

Reactants

The inventive process is a copolymerization of an alpha, beta-unsaturated nitrile with an amino acid. Any alpha, beta-unsaturated nitrile can be polymerized in accordance with this invention. The preferred nitriles contain less than 40 carbon atoms and are represented by the following formula:

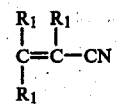

wherein each $R_1$ is independently selected from the group consisting of:
(1) hydrogen; and
(2) $C_{1-30}$ alkyls.

More preferred nitriles are those wherein each $R_1$ is independently selected from hydrogen and $C_{1-4}$ alkyls. Examples of these nitriles include acrylonitrile and methacrylonitrile.

Any amino acid can be used as a comonomer in the instant invention. The preferred acids are saturated, contain less than 40 carbon atoms and can be represented by the following formula:

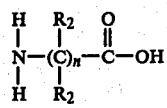

wherein n is 2 to 11 and wherein each $R_2$ is independently selected from the group consisting of:
(1) hydrogen;
(2) $C_{1-30}$ alkyls;
(3) 5 to 7 membered nitrogen-containing heterocyclic radicals;
(4) mono and poly carbocyclic radicals containing up to 30 carbon atoms; and
(5) halides.

More preferred acid are those wherein each $R_2$ is independently selected from:
(1) hydrogen;
(2) $C_{1-5}$ alkyls; and
(3) 5 or 6 membered carbocyclic radicals.

The most preferred acids are those wherein each $R_2$ is independently selected from hydrogen and methyl. Examples of saturated amino acids which are included within the scope of this invention are beta-alanine, omega-aminocaproic acid, 11-aminododecanoic acid, 12-aminododecanoic acid, 7-aminoheptylic acid and 8-aminocapylic acid.

It must be noted that it is very difficult to form a copolyamide from a nitrile and one of 4-aminobutyric acid or 5-aminovaleric acid. Both of these acids readily lose water to yield the corresponding 5- and 6-membered lactams. However, the water will still react with the acrylonitrile in the system to form a polyamide.

The molar ratio of the nitrile to the amino acid is preferably 0.2-5:1, more preferably about 1:1.

Process Conditions

The instant polymerization process can be conducted under a broad range of process conditions. Generally, the process conditions are the same as those disclosed in the prior art for making these polyamides from acrylonitrile and from the amino acid.

Control of the amount of available water in the reaction system is important. The amount of water which is preferably present in the reaction system will depend upon a number of factors including the reactants employed, process conditions and desired products. With a given set of reactants and process conditions, the effect at different water concentrations can be readily determined and then controlled to produce the desired polymer.

For every mole of amino acid reacted, a mole of water is produced. Moreover, for every mole of alpha, beta-unsaturated nitrile reacted, a mole of water is required. Thus, it is necessary to maintain a balance so that there is sufficient water to react with the alpha, beta-unsaturated nitrile but not an excessive amount of water which may partially inhibit the polymerization of the amino acid. The amount of water in the system can be controlled by adjusting the ratio of the reactants, adding water, or by adding something to the reaction system which will tie-up water, e.g. molecular seives and metal alkoxides.

It is also important to maintain suitable contact between the reactants so that the desired reaction can occur. Although suitable contact time can be established by maintaining the reactants in the solid, liquid or gaseous phase, it is preferred to perform the reaction in the liquid phase. This liquid phase can be obtained by various methods including the use of solvents.

In the preferred practice of the invention, the reactants are maintained at a temperature above their melting points but below the decomposition temperature of the reactants or products, which is generally about 350° C. It is more preferred to conduct this process at a temperature between 125° C. and 250° C., and conducting the process between 160° and 200° C. is most preferred.

The time required for the instant polymerization process will depend upon various process parameters. For example, at low temperatures it will take longer for the polyamide to form than at high temperatures. In general, the reaction is conducted in less than 48 hours with times ranging from 8 to 24 hours normally being adequate to produce polymers.

Although the reactants can be polymerized in contact with the atmosphere, a more desirable group of polymers having high intrinsic viscosities and molecular weights can be obtained by carrying out the polymerization in the absence of oxygen. This can be achieved by blanketing the reaction mixture with either an inert gas such as nitrogen or with gaseous ammonia.

The instant reaction can proceed at atmospheric, superatmospheric or subatmospheric pressure. Preferably, the reactants are heated under superatmospheric pressures. It has been found that pressures such as 0 psig to 5,000 psig are preferable with 50 to 2,000 psig being most preferable.

The polymerization process of the instant invention can proceed by any of the generally known modes of polymerization including bulk, slurry, suspension or solution polymerization by batch, continuous or intermittent addition of the monomers and other components.

It is often convenient to carry out the instant polymerization in the presence of a diluent which may also be a solvent for the reactants, products or both. Inert diluents which can be used in the process of this invention include hydrocarbons such as benzene, toluene, xylene, ethylbenzene, solvent naphtha, n-hexane, cyclohexane, isooctane and decalin; ethers such as dioxane, diethyl ether, dibutyl ether and dimethoxy ethane; aromatic halogenated compounds such as chlorobenzene and dichlorobenzene; and tertiary amines such as triethyl amine, tributyl amine, pyrridine and dimethyl analine. Another solvent which may be used in the instant process is n-methyl-2-pyrrolidone. In addition to these organic diluents, an anhydrous solvent such as liquid ammonia may also be used.

It is preferred to conduct this reaction in the absence of free radical initiators. Although no catalyst or inhibitor is needed to conduct this reaction, it is normally preferable to add free radical inhibitors. Examples of these inhibitors include hydroquinone, p-methoxy phenol, n-phenyl-2-naphthylamine, pyrocatechol and phenothiazine. The amount of such an inhibitor which may be added can vary over a wide range, but generally is within the range of from about 0.005% to 1.0% based on the weight of the monomers.

Recovery

At the end of the reaction period the unreacted reactants are removed from the reaction mass by any suitable means, e.g. distillation, extraction with a solvent or mixture of solvents or by combination of such techniques. The unreacted material may be removed in conjunction with the removal of low molecular weight polymers, if desired. Any suitable solvent or mixture of solvents may be employed in purifying the crude reaction product. The action of the solvent is more or less selective. If the polymerization reaction is carried out in an inert organic diluent in which the polymer is insoluble, the polymer will precipitate and may be removed by filtration, centrification, etc. The polymer which is obtained may easily be purified by extracting it with a liquid that is a solvent for the monomer but which is not a solvent for the polymer. Frequently, water is used for this purpose.

The polymers produced as herein described have a wide variety of applications. Generally, they may be used in any application calling for a polyamide. For example, these polymers can be used as fibers, plastics, films and molding resins.

SPECIFIC EMBODIMENTS

In order to provide a better understanding of the present invention, the following working examples are presented. In each of the examples, the polymer formed was identified by various analytical techniques as containing a polyamide with a three carbon backbone.

COMPARATIVE EXAMPLE A

Polymerization of Acrylonitrile

Acrylonitrile and water in a one to one molar ratio were charged into a 25 ml. pyrex glass ampoule. The ampoule was purged with nitrogen for 30 seconds and then sealed with a flame. The closed ampoule was placed into a protective metal cage which was then placed in an air oven at 175° C. After 24 hours, the cage was removed from the oven and cooled to room temperature. The closed ampoule was opened with a hot glass rod after the ampoule was cooled down in a dry ice/isopropanol bath (−78° C.) for 5 minutes. The cooled polymer was dissolved in formic acid and then precipitated in methanol. The resulting powdery polymer was dryed in a vacuum over at 40° C. for 16 hours and the water extracted overnight. This polymer was identified by infrared spectrascopy and proton nuclear magnetic resonance spectroscopy as containing substantial portions of a polyamide. However, the conversion was only 5.3%.

COMPARATIVE EXAMPLE B

Polymerization of Beta-Alanine

Beta-alanine was charged to the reaction system described in Comparative Example A. The reaction temperature was 175° C. and the reaction time was 24 hours. The polymer formed was identified by infrared spectrascopy as a polyamide. The conversion to the polyamide was 71.7%.

EXAMPLES 1 THRU 7

Formation of Polyamides Using Various Monomers

Various monomers were charged with acrylonitrile to the experimental apparatus described in Comparative Example A. The identity of these monomers, the reaction temperatures, the reaction times and various physical data are shown in Table I. Each of the polymers formed in these examples was identified as containing a polyamide by infrared spectrascopy.

TABLE I

Preparation of Polyamide Using Various Monomers
Reactor: Closed Ampoule

| Ex | Monomer(s) | Wt (gms) (Molar Ratio) | React Time (Hr) | React Temp (°C.) | Wt of Polymer (gms) | % Conver | % $H_2O$ Insol | Melt Pt (°C.) | Struct[1] | % Cryst |
|---|---|---|---|---|---|---|---|---|---|---|
| A | Acrylo/Water | 2.94/1.00 (1:1) | 24 | 175 | 0.23 | 5.3 | less than 5 | 340 | Ny-3[2] | — |
| B | Beta-Alanine | 3.05 | 24 | 175 | 1.77 | 71.7 | 63.0 | 340 | Ny-3 | 30.6 |
| 1 | Acrylo/Beta-Alanine | 1.84/3.43 (0.9:1) | 24 | 175 | 3.75 | 71.2 | 66.9 | 340 | Ny-3 | 23.4 |
| 2 | Acrylo/Beta-Alanine | 2.00/3.39 (1:1) | 24 | 175 | 3.44 | 63.8 | 68.3 | 340 | Ny-3 | 24.4 |
| 3 | Acrylo/Beta-Alanine | 1.84/3.35 (0.9:1) | 40 | 175 | 3.97 | 76.5 | 67.5 | 340 | Ny-3 | 25.9 |
| 4 | Acrylo/Beta-Alanine | 2.00/3.40 (1:1) | 40 | 175 | 4.09 | 75.7 | 69.1 | 340 | Ny-3 | 22.1 |
| 5 | Acrylo/6-Amino Caproic Acid | 1.62/4.00 (1:1) | 24 | 175 | 5.62[3] | 100.0 | 13.7 | 174 | 34% Ny-3 66% Ny-6 | 33.9 |
| 6 | Acrylo/11-Amino Decanoic Acid | 1.05/4.00 (1:1) | 24 | 194 | 5.05[3] | 100.0 | 96.6 | 137 | 40% Ny-3 60% Ny-11 | 47.4 |
| 7 | Acrylo/12-Amino Dodecanoic Acid | 0.39/1.60 (1:1) | 24 | 194 | 1.99[3] | 100.0 | 93.2 | 131 | 43% Ny-3 57% Ny-12 | 42.4 |

[1]Structure was determined by infrared spectrascopy and proton-nuclear magnetic resonance.
[2]Ny denotes Nylon.
[3]The polymer was directly water extracted for 24 hours after the ampoule was opened.

The preceeding examples show that reacting an alpha, beta-unsaturated nitrile with an amino acid results in the formation of polyamides which have excellent physical properties. In particular, one or more of the physical properties of the resultant resin, e.g. water insolubility, crystallinity or melting point, can be substantially improved by the process of this invention.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:
1. A process for producing a polymer containing a polyamide repeating unit comprising contacting an alpha, beta-unsaturated nitrile with an amino acid.
2. The process of claim 1 wherein said process is conducted in the presence of a free radical inhibitor.
3. The process of claim 1 wherein said alpha, beta-unsaturated nitrile is at least one of acrylonitrile and methacrylonitrile.
4. The process of claim 1 wherein said process is conducted at a temperature between 125° C. and 225° C.
5. The process of claim 1 wherein said process is carried out in the absence of oxygen.
6. The process of claim 5 wherein said process is carried out in the presence of gaseous ammonia.
7. The process of claim 1 wherein there is at least one mole of water per mole of alpha, beta-unsaturated nitrile.
8. The process of claim 1 wherein acrylonitrile is copolymerized with beta-alanine.
9. The process of claim 1 wherein acrylonitrile is copolymerized with omega-aminocaproic acid.
10. The process of claim 1 wherein acrylonitrile is copolymerized with at least one of 11-amino dodecanoic acid and 12-amino dodecanoic acid.
11. The process of claim 1 wherein the molar ratio of the alpha, beta-unsaturated nitrile to the amino acid is 0.2–5:1.
12. The process of claim 11 wherein the molar ratio is about 1:1.
13. A process for producing a copolymer containing at least two types of polyamide repeating units comprising contacting an alpha, beta-unsaturated nitrile with an amino acid of the following structure:

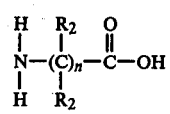

wherein $R_2$ is a inert hydrocarbon substituent and n is 2 to 11.

* * * * *